United States Patent [19]
Jones et al.

[11] Patent Number: 5,579,814
[45] Date of Patent: Dec. 3, 1996

[54] METHOD AND APPARATUS FOR CHARGING DAMPERS WITH PRESSURIZED GAS

[75] Inventors: Gareth M. Jones, Parkside; Jeffrey A. Jenkins, Bellevue Heights; Michael J. Shnier, St. Georges, all of Australia

[73] Assignee: Monroe Auto Equipment Company, Monroe, Mich.

[21] Appl. No.: 508,043

[22] Filed: Jul. 27, 1995

Related U.S. Application Data

[63] Continuation-in-part of Ser. No. 210,039, Mar. 17, 1994, abandoned.

[51] Int. Cl.⁶ .................. B65B 1/04; B65B 3/00
[52] U.S. Cl. .................. 141/383; 141/384; 141/64; 141/98; 141/368; 188/322.21; 267/64.28
[58] Field of Search .................. 141/4, 37, 44, 141/46, 63, 64, 98, 311 R, 312, 325, 368, 372, 384, 385, 383; 188/322.21; 267/64.28

[56] References Cited

U.S. PATENT DOCUMENTS

| Re. 28,329 | 2/1975 | Nicholls | 267/65 |
|---|---|---|---|
| 4,005,769 | 2/1977 | Itoh | 188/315 |
| 4,114,866 | 9/1978 | Kato | 267/64 |
| 4,131,139 | 12/1978 | Tanabe | 141/4 |
| 4,185,721 | 1/1980 | Karklins et al. | 188/322 |
| 4,219,190 | 8/1980 | Nagase | 267/65 |
| 4,483,377 | 11/1984 | Cubalchini | 141/349 |
| 4,491,160 | 1/1985 | Axthammer et al. | 141/349 |
| 4,556,092 | 12/1985 | Cubalchini | 141/98 |
| 4,564,138 | 1/1986 | Bethell et al. | 228/176 |
| 4,865,170 | 9/1989 | Ciepichal | 188/322.17 |

Primary Examiner—Henry J. Recla
Assistant Examiner—Steven O. Douglas
Attorney, Agent, or Firm—Harness, Dickey & Pierce, P.L.C.

[57] ABSTRACT

A method and apparatus for charging a damper with pressurized gas by forming a flow passage between the dust lip of the oil seal and the piston rod. The flow passage is formed by locally deforming the dust lip under the action of a distortion clamp. A source of pressurized gas is then placed in communication with the flow passage. The pressurized gas causes the oil seal to be displaced away from the piston rod, and the gas enters the damper between the oil seal and the piston rod. When the gas within the damper has attained the desired pressure, the distortion clamp is released allowing the dust lip to return to normal circumferential contact with the piston rod, and the source of pressurized gas is removed. The pressurized gas is retained in the damper after charging by the seal engaging the rod.

18 Claims, 4 Drawing Sheets

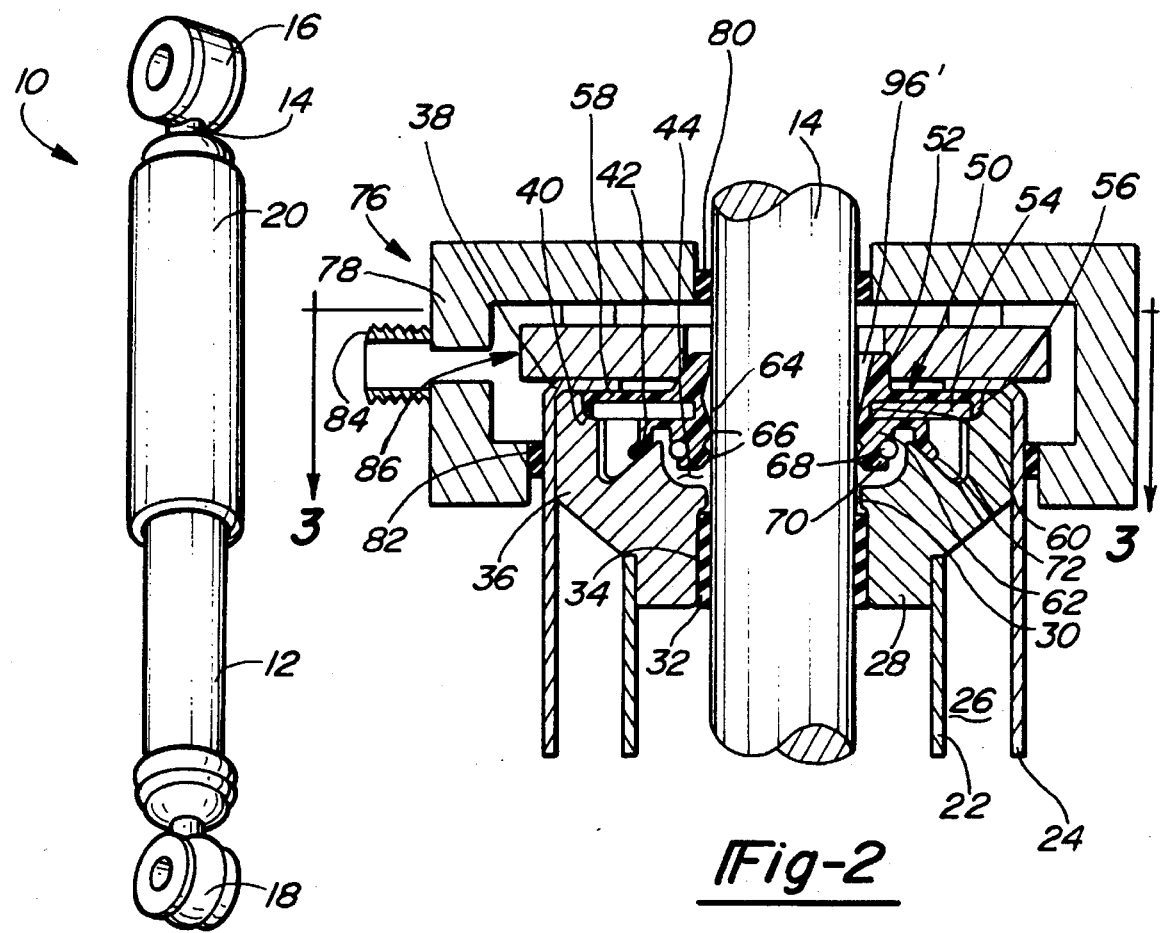
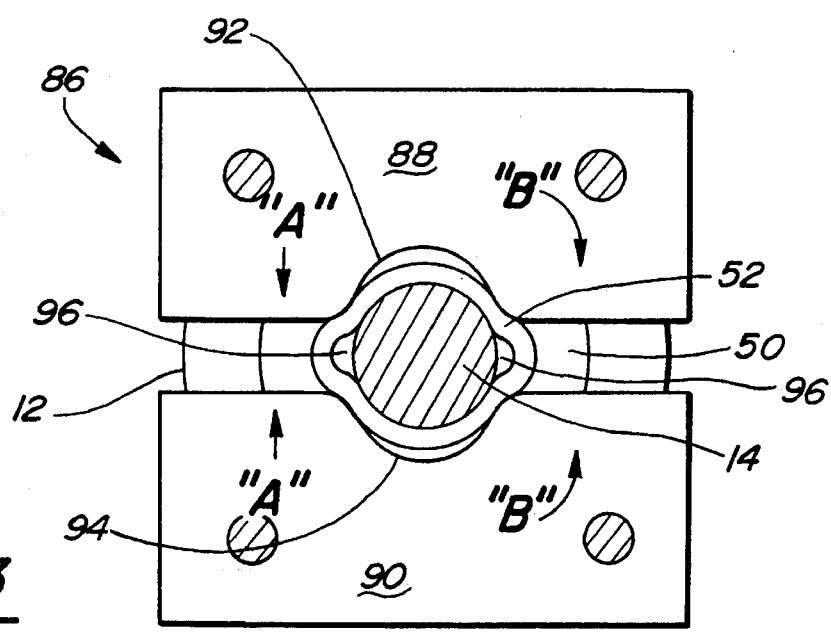

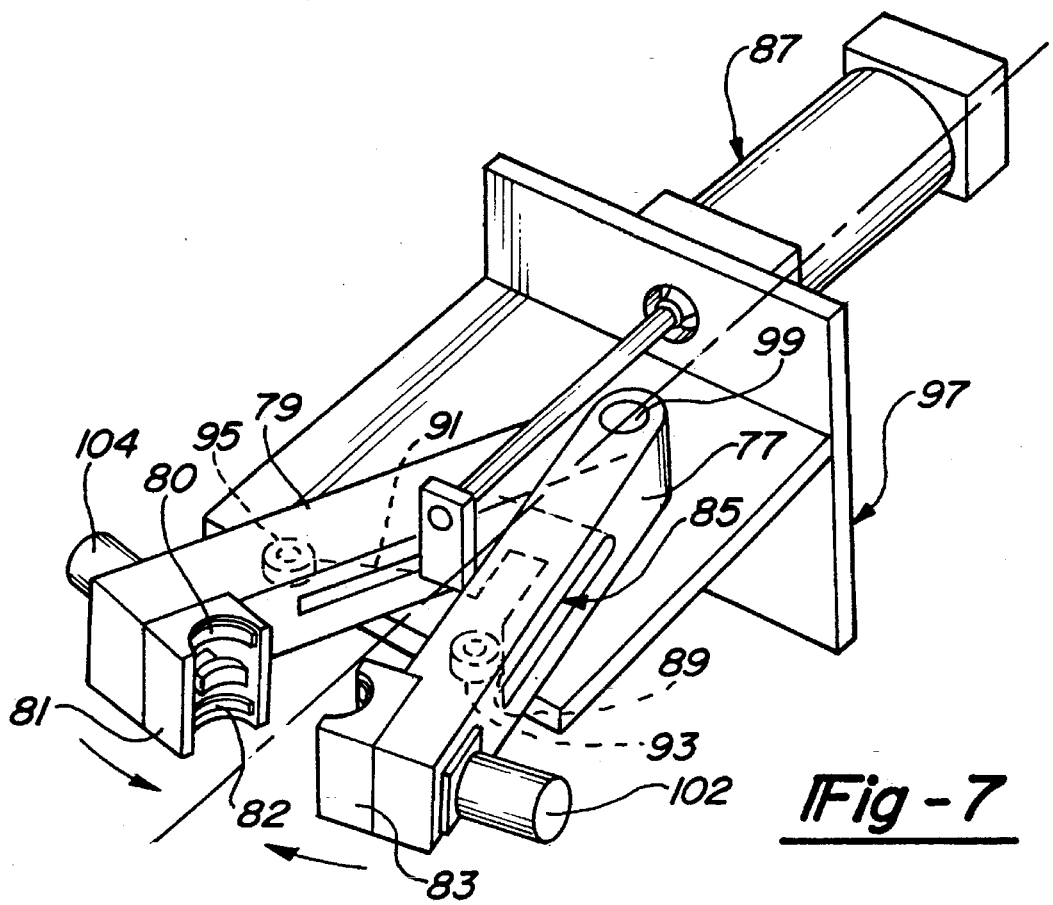
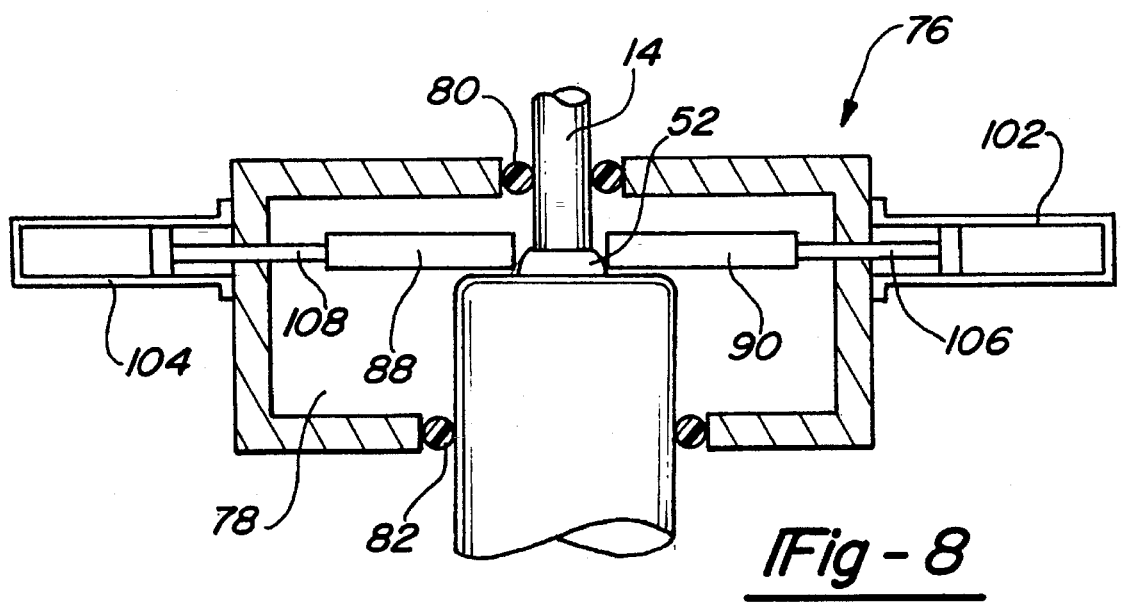

5,579,814

METHOD AND APPARATUS FOR CHARGING DAMPERS WITH PRESSURIZED GAS

This application is a continuation-in-part of U.S. Pat. application Ser. No. 08/210,039, filed Mar. 17, 1994, now abandoned, entitled *Method and Apparatus for Charging Dampers with Pressurized Gas*, the specification and drawings of which are expressly incorporated by reference.

BACKGROUND OF THE INVENTION

1. Field of the Invention

The present invention generally relates to gas pressurized hydraulic dampers, and more particularly, to a method and apparatus for charging such dampers with pressurized gas.

2. Description of the Related Art

Gas pressurized hydraulic dampers, such as shock absorbers and struts, are well-known and have found numerous applications on road driven vehicles and most notably on automobiles and light trucks. Such gas pressurized hydraulic dampers generally have an inner pressure cylinder and outer reserve cylinder with the space therebetween forming a reserve chamber which is used to store a pressurized gas such as nitrogen. The pressurized gas which is located within the reserve chamber is used for improving ride comfort and road holding ability.

Several methods have been developed for introducing the pressurized gas into the reserve chamber of the damper during manufacture. In this regard, U. S. Pat. No. 4,564,138, commonly owned by the assignee of the present invention and the disclosure of which is expressly incorporated by reference, discloses a method for charging a shock absorber with pressurized gas. The method involves forming a hole in the reserve chamber of the shock absorber cylinder after completing assembly of the shock absorber. Pressurized gas is allowed to flow through the hole and into the shock absorber. The hole is then sealed by placing a metal ball over the hole and welding the ball to the cylinder.

Other methods, such as those disclosed in U.S. Pat. Nos. 4,491,160 and 4,131,138, provide for charging a shock absorber with pressurized gas by forming a locally reduced cross-sectional area on the piston rod. The reduced cross-sectional area is aligned with the seal to create a passage for pressurized gas into the shock absorber. Once the pressure of the gas within the shock absorber has reached the desired level, the rod is displaced axially relative to the seal so that the full cross-sectional area of the piston rod engages the seal so as to retain the gas within the shock absorber.

A further method for charging a damper with pressurized gas is disclosed in U.S. Pat. No. 4,044,866. The method disclosed in this reference also incorporates use of a reduced cross-sectional area formed on the piston rod which is able to be aligned with a seal to form a passage for charging the damper with pressurized gas. After the damper is charged, the seal is displaced to prevent reformation of the passage during use and thus leaking of the gas from the damper.

Another method of charging a damper with gas is disclosed in U.S. Pat. No. 4,114,866. The method disclosed in this reference involves axially displacing the seal away from an upper portion of the cylinder assembly of the damper and against the resistance of a retaining spring. Pressurized gas is then passed between the displaced seal and the cylinder. Once the desired level of pressure is obtained, the force displacing the seal is released, and the seal moves into contact with the cylinder assembly under urging of the retaining spring thus sealing the gas within the damper.

Still another method of charging a damper with gas is commonly known as auto-nibbing. Auto-nibbing involves inserting a nib between the piston rod seal and the piston rod and injecting pressurized gas therethrough into the shock absorber.

While these methods are effective, they also suffered from several disadvantages. For example, methods involving the use of a piston rod with a reduced cross-sectional generally require additional processing to form the reduced cross-sectional area on the piston rod. In addition, the piston rod must be precisely aligned with the seal to form the passage for the gas during the charging operation. Furthermore, some provision must be made for preventing the piston rod from realigning with the seal and thus allowing the gas to leak from the shock.

There are also disadvantages with respect to those methods which involve axially displacing a seal against the resistance of a retaining spring. In this regard, this method has the disadvantage of requiring the use of a complex seal assembly as well as the retaining spring.

SUMMARY OF THE INVENTION

The present invention provides for charging a damper with pressurized gas by forming a passage between the dust lip of the oil seal and the piston rod. The passage is formed by locally deforming the dust lip under the action of a distortion clamp. A source of pressurized gas is then placed in communication with the passage. The pressurized gas causes the remainder of the oil seal to be displaced from the piston rod thereby allowing gas to enter the damper between the seal and the piston rod. When the pressure of gas within the damper has attained the desired level, the distortion clamp is released thereby allowing the dust lip to return to normal circumferential contact with the piston rod, and then the source of pressurized gas is removed. A valve member is integrally formed with the oil seal which is used for preventing the pressurized gas from leaking from the damper once the gas enters the cylinder.

BRIEF DESCRIPTION OF THE DRAWINGS

The above stated advantages and features of the present invention will be more fully understood and appreciated by those skilled in the art by studying the following detailed description of a preferred embodiment and the accompanying drawings in which:

FIG. 1 is an elevational view of a typical damper which is able to be charged with pressurized gas by using the apparatus according to the teachings of the preferred embodiment of the present invention;

FIG. 2 is a longitudinal partial cross-sectional view of a top portion of a damper illustrated in FIG. 1 and shown in operative association with the apparatus for charging a damper with pressurized gas according to the teachings of the preferred embodiment of the present invention;

FIG. 3 is a sectional view taken along line 3—3 of FIG. 2 illustrating the distortion clamp and the flow passages formed according to the teachings of the preferred embodiment of the present invention;

FIG. 7 is a view like FIG. 5 of another embodiment of the present invention.

FIG. 8 is a cross-section view of FIG. 7 in an operating condition.

DESCRIPTION OF THE PREFERRED EMBODIMENT

Figure 4A:
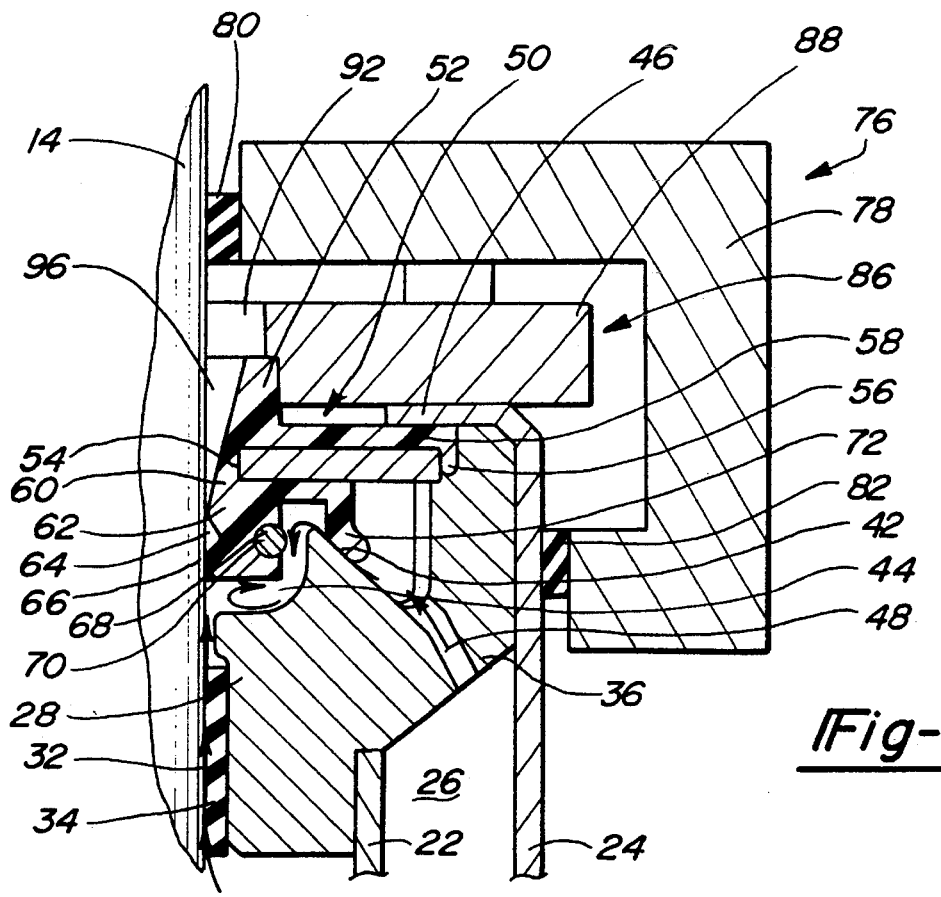
FIG. 4A is an enlarged sectional view illustrating the closure of the first and second flow passages upon completion of the gas charging for retaining the pressurized gas within the damper according with the teachings of the preferred embodiment of the present invention.

The following discussion of the preferred embodiment of the present invention is merely exemplary in nature. Accordingly, this discussion in no way is intended to limit the scope of the invention, the application of the invention or the use of the invention.

Referring to FIG. 1, a damper 10 is shown which is able to be charged with pressurized gas according to the preferred embodiment of the present invention. The damper 10 may be of the type commonly used on automotive vehicles and includes a cylindrical housing 12 within which a piston (not shown) is disposed. As will be appreciated by those skilled in the art, the piston is used to generate damping forces by controlling the flow of hydraulic fluid between the upper and lower working chamber of the damper 10. The piston mechanically communicates with a piston rod 14 which is used to deliver the damping forces generated by the piston to the body of an automotive vehicle.

The damper 10 includes an upper and lower mounting member 16 and 18 which are provided for securing the damper 10 to the frame and suspension of an automobile respectively. The damper 10 also includes a dust shield 20 which is secured to the upper mounting member 16. The dust shield 20 is used for reducing the amount of dirt and contamination which contacts the exposed portion of the piston rod 14 above the housing 12.

The internal components of the damper 10 will now be described with reference to FIG. 2. In this regard, the cylindrical housing 12 is shown to include concentrically located inner pressure cylinder 22 and an outer reserve cylinder 24 respectively. The inner pressure cylinder 22 is used to store hydraulic fluid which is used to provide the desired damping characteristics, while the reserve cylinder 24 is used to define with the pressure cylinder 22 a reserve chamber 26 for receiving pressurized gas and reserve oil volume. A rod guide 28 sealingly engages the upper end of the pressure cylinder 22 and includes a central opening 30 through which the piston rod 14 extends. A rod bearing 32 is also provided and is disposed in a recessed portion 34 of the central opening 30 of the rod guide 28 and provides bearing support for the reciprocating rod.

The rod guide 28 further includes an outwardly extending portion 36 which engages the reserve cylinder 24. The outwardly extending portion 36 is operable to maintain a substantially concentric alignment of the pressure cylinder 22 with respect to the reserve cylinder 24. The upper portion of the rod guide 28 is formed with a seal seat 40, a valve seat 42 and a central chamber 44. A flange portion 46, as shown in FIG. 4A, of reserve cylinder 24 retains the rod guide 28 in position between the pressure cylinder 22 and the reserve cylinder 24. The seal seat 40 and the valve seal 42 are used to engage an oil seal which is described below, while the central chamber 44 is used to provide a portion of a flow passage for pressurized gas to flow into the reserve chamber 26. The rod guide 28 also includes passage 48 for allowing gas and oil to flow through the rod guide 28 and into the reserve chamber 26 in a manner now fully described below.

The damper 10 also includes an oil seal 50 which is used for preventing hydraulic fluid and pressurized gas located within the damper 10 from leaking to the exterior of the damper 10. The oil seal 50 is retained against seal seat 40 by the flange portion 46 of the reserve cylinder 24. The oil seal 50 includes a dust lip 52 which is used for preventing dust from entering the damper 10. In addition, the oil seal 50 includes a washer shaped support member 54 which is retained between a lip portion 56 of an outwardly extending flange 58 and a groove 60 formed in the central portion 62 of the oil seal 50. The central portion 62 of the oil seal 50 includes an opening 64 through which the piston rod 14 extends. The opening 64 is formed with a plurality of seal lips 66 for engaging the piston rod 14 and for preventing hydraulic fluid and pressurized gas from leaking from the damper 10. A circular spring member 68 is also provided and is seated in a groove 70 formed in the central portion 62. The spring member 68 is used for maintaining the seal lips 66 of the oil seal 50 in contact with the piston rod 14 under normal operating conditions.

To provide means for charging the damper 10 with pressurized gas, a gassing apparatus 76 is provided. The gassing apparatus 76 is operable to receive the upper portion of the damper 10 before the dust shield 20 is attached and is able to deliver pressurized gas to the region of the damper 10 adjacent to the dust lip 52. The gassing apparatus 76 includes the gas delivery chamber 78 which has a plurality of seals 80 and 82 for sealing the gas delivery chamber 78 to the piston rod 14 and the cylindrical housing 12, respectively. In addition, the gassing apparatus 76 also includes a fitting 84 which is used for connecting the gas delivery chamber 78 to a source of pressurized gas (not shown).

Also, the gassing apparatus 76 includes a pair of arms 77 and 79 which are pivoted with respect to one another at one end and at the other end include gassing heads 81 and 83 which form the gas delivery chamber 78. A cam 85 driven by a piston rod of cylinder 87 opens and closes the arms 77 and 79 to clamp and release around the damper 10. The cam 85 includes angled cam surfaces 89 and 91 which roll on bearings 93 and 95 positioned in the arms 77 and 79. As the cam surfaces 89 and 91 ride along the bearings, the arms 77 and 79 are clamped together which, in turn, via the gassing heads 81, 83 clamp the damper 10 as seen in FIGS. 2 through 4. The distortion clamp 86 as best seen in FIG. 2, which includes the jaw members 88 and 90, is secured to the gassing heads 81 and 83. The jaws 88 and 90 are secured by fasteners to the gassing heads 81 and 83. Also, the gassing apparatus 76 includes a frame 97 which receives the pivot 99 which secures the ends of the arms 77 and 79 to the frame 97.

To provide means for forming a second flow passage for pressurized gas, the gassing apparatus 76 further includes a distortion clamp 86 which is operable to engage the dust lip 52 of the oil seal 50. The distortion clamp 86 includes first jaw member 88 and a second jaw member 90. The first and second jaw members 88 and 90 each have central arcuate recesses 92 and 94, respectively, which are of approximately the same radius as the piston rod 14. The first and second jaw members 88 and 90 are operable to be positioned around the piston rod 14 with the arcuate recesses 92 and 94 located adjacent the dust lip 52 of the oil seal 50. Upon closing of the first and second jaw members 88 and 90, the arcuate recesses 92 and 94 engage the dust lip 52 and cause the dust lip 52 to distort to thereby form a second flow passage 96 for pressurized gas.

Figure 4B:
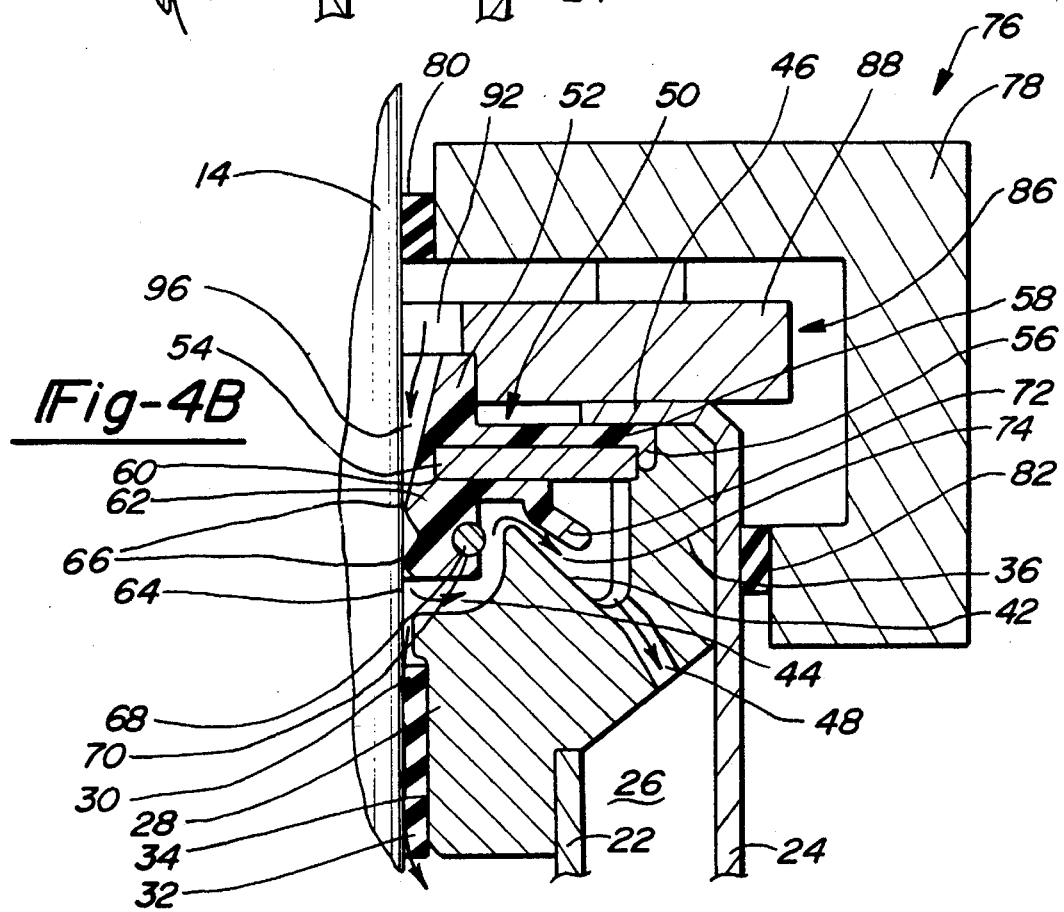
FIG. 4B is an enlarged sectional view illustrating the first and second gas flow passages for charging the damper with gas while pressurized gas is being communicated thereto according to the teachings of the preferred embodiment of the present invention.

The method according to the present invention will now be described. The upper portion of the damper 10 is initially received within the gassing apparatus 76. The first and second jaw members 88 and 90 of the distortion clamp are then closed about the dust lip 52 so as to form the second flow passage 96. With the first and second jaw members 88 and 90 closed about the dust lip 52, pressurized gas is delivered to the gas delivery chamber 78. The seals 80 and 82 maintain the pressurized gas about the top portion of damper 10. The pressurized gas entering the gas delivery chamber 78 is delivered to the second flow passage 96 causing the pressure of the gas acting on the oil seal lips 66 to increase. The oil seal lips 66, under force of the pressurized gas, are then radially displaced from the piston rod 14 so as to cause pressurized gas to flow between the oil seal lips 66 and the piston rod 14 and to enter the central chamber 44. From the central chamber 44, the pressurized gas causes the valve member 72 to be displaced from the valve seat 42 so as to allow pressurized gas to flow through the first flow passage 74 and into the reserve chamber 26 as shown in FIG. 4B. Pressurized gas can also flow between rod bearing 32 and rod 14 into the pressure cylinder 22.

Once the pressurized gas is delivered into the central chamber 44 and the pressure in the central chamber 44 and the delivery chamber 78 equalize the seal lips 66 close and seal against rod 14. The delivery chamber 78 is then depressurized and the seal lips 66 seal against the rod 14 preventing pressurized gas from escaping from chamber 10, as shown in FIG 4A. After charging of the damper 10 is completed, the first and second jaw members 88 and 90 are moved out of engagement with the dust lip 52 so as to allow the dust lip 52 to return to its normal condition in circumferential contact with the piston rod 14. The gassing apparatus 76 is then removed from the damper 10 and then the assembly of the damper 10 is completed.

As will be appreciated by those skilled in the art, there are a number of relative motions through which the first and second jaw members 88 and 90 may engage the dust lip 52. For example, if the first and second jaw members 88 and 90 translate linearly relative to each other as indicated by arrow "A" in FIG. 3, the result is the formation of two second flow passages 96 as shown. If, however, the first and second jaw members 88 and 90 are made to pivot in a scissors type motion as indicated by arrows "B" in FIG. 3, the result is the formation of a single second flow passage 96' as shown in FIG. 2. Moreover, it should be understood that the distortion clamp may have more than two jaw members which may be used and moved together with the resulting formation of a plurality of second flow passages 96.

Figure 5:
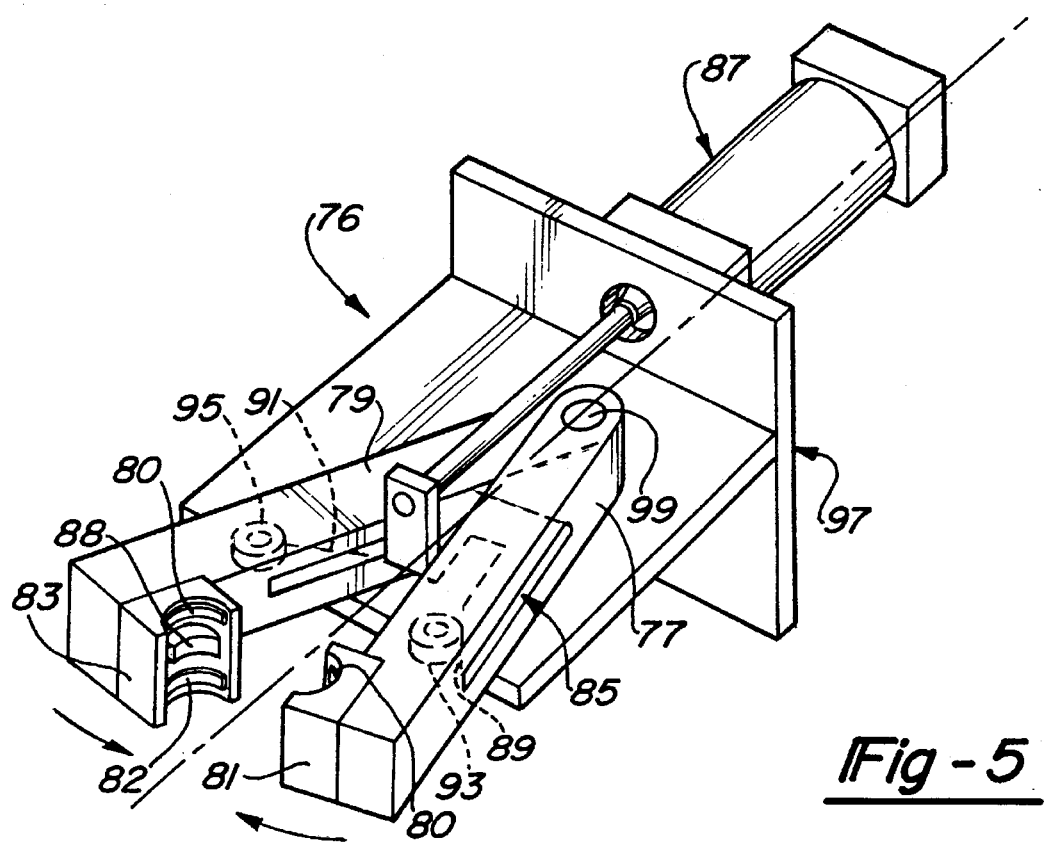
FIG. 5 is a perspective view of the apparatus for charging a damper in accordance with the invention.
Figure 6:
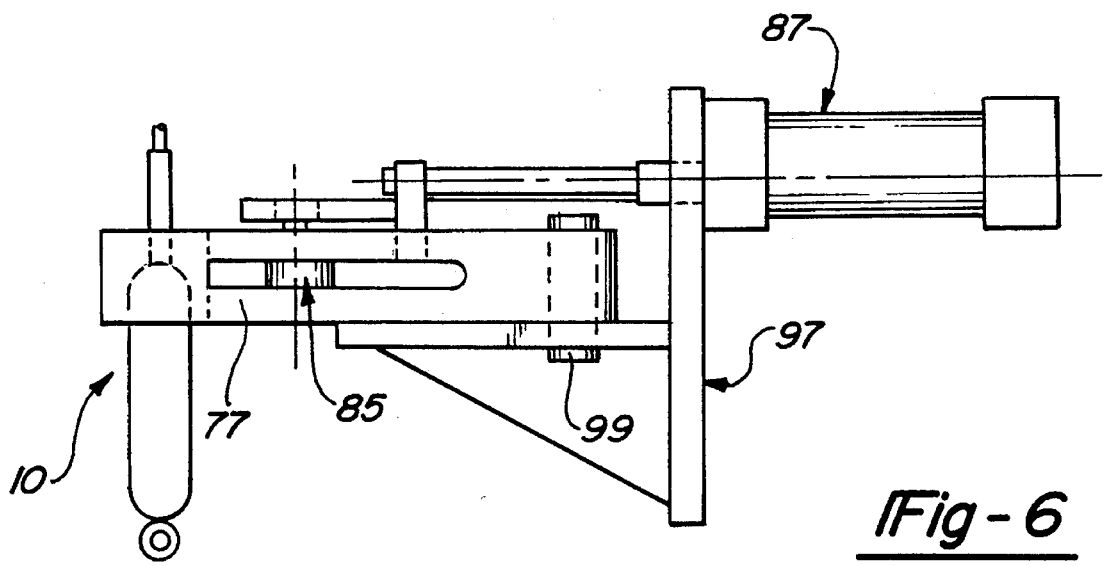
FIG. 6 is a side elevation view of FIG. 5 with a damper positioned in the clamping apparatus.

Turning to FIGS. 7 and 8, another embodiment of the gassing apparatus is shown. The gassing apparatus in FIG. 7 is substantially the same as that illustrated in FIG. 5 and the same reference numerals will be used to designate the same elements.

In FIG. 7, individual cylinders 102 and 104 are positioned on arms 77 and 79. The cylinders 102 and 104 include the jaw members 88 and 90 secured to piston rods 106 and 108. In this embodiment, as illustrated in FIGS. 7 and 8, the clamping members 88 and 90 are moved independently in the gassing heads 81 and 83.

As will be appreciated by those skilled in the art, the method and apparatus of the present invention does not require precise positioning on the piston rod during charging or means for restricting the movement of the piston rod or seal after charging to prevent leakage. The present invention also eliminates the need for specially processing the piston rod to form a gas charging groove or passage. The method and apparatus of the preferred invention further possesses the advantages of requiring low capital investment and a minimum of tooling. Furthermore, the tooling is subject to a minimum of wear thereby reducing maintenance and associated process down time while enhancing process capability and control. The method may also be performed on-line during manufacture of the damper assembly with a short cycle time.

A specific embodiment of the present invention as been shown and described in detail to illustrate the principles of the present invention. The present invention may be used in conjunction with the manufacture of gas charged shock absorbers, struts or springs without departing from its fair scope, Accordingly, it will also be understood that the invention may be embodied in other forms without departing from such principles and the fair scope of the present invention.

What is claimed is:

1. An apparatus for charging a damper with pressurized gas, said damper including a housing, a rod extending from said housing, and a seal disposed between said housing and said rod, said apparatus comprising:

means for squeezing said seal so as to distort said seal to form a flow passage for said pressurized gas to flow between said seal and said rod; and means for delivering said pressurized gas to said flow passage.

2. The apparatus for charging a damper with pressurized gas as set forth in claim 1, wherein said means for squeezing said seal is further operable to form a plurality of flow passages for said pressurized gas to flow between said seal and said rod.

3. The apparatus for charging a damper with pressurized gas as set forth in claim 1, wherein said means for delivering pressurized gas to said flow passage is operable to sealingly engage a region of said damper proximate to said seal.

4. The apparatus for charging a damper with pressurized gas as set forth in claim 3, wherein said means for squeezing said seal is disposed within said means for delivering pressurized gas to said flow passage.

5. The apparatus for charging a damper with pressurized gas as set forth in claim 1, wherein said means for squeezing said seal is operable to compress a region of said seal so as to form said flow passage.

6. The apparatus for charging a damper with pressurized gas as set forth in claim 1, wherein said means for squeezing said seal comprises:

a first member operable to engage a portion of said seal; and a second member operable to engage a portion of said seal, whereby relative movement of said first member with respect to said second member is operable to form said flow passage.

7. The apparatus for charging a damper with pressurized gas as set forth in claim 1, further comprising a seal disposed within said damper being operable to allow said pressurized gas to flow into said damper.

8. The apparatus for charging a damper with pressurized gas as set forth in claim 7, wherein said seal is further operable to retain said pressurized gas within said housing.

9. An apparatus for charging a damper with pressurized gas, said damper having a housing and a piston rod extending from said housing, said piston rod being sealed with respect to the housing by a seal, said apparatus comprising:

a distortion clamp for squeezing said seal causing a temporary distortion of said seal; and a gas delivery chamber operable to sealingly engage said housing of said damper adjacent the piston rod, whereby pressurized gas is allowed to enter said damper through said temporary distortion formed in said seal.

10. The apparatus for charging a damper with pressurized gas as set forth in claim 9, wherein said distortion clamp includes first and second members operable to be disposed about said seal, whereby relative movement of said first member with respect to said second member is operable to compress a portion of said seal to form said temporary distortion.

11. The apparatus for charging a damper with pressurized gas as set forth in claim 10, wherein said distortion clamp is disposed within said gas delivery chamber.

12. A method for charging a damper with pressurized gas, said damper comprising a housing, a rod extending from said housing and a seal disposed between the housing and the rod, said method comprising:

temporarily squeezing said seal so as to distort said seal to form a first flow passage; and delivering pressurized gas to said first flow passage thereby charging said damper with said pressurized gas.

13. The method for charging a damper with pressurized gas as set forth in claim 12, further comprising the additional steps of:

securing a gas delivery chamber about said housing at a position adjacent to said piston rod and said seal;

sealing said gas delivery chamber with respect to said housing and said piston rod; and delivering pressurized gas to said gas delivery chamber.

14. The method for charging a damper with pressurized gas as set forth in claim 12, wherein said step of temporarily distorting said seal is operable to form a plurality of first flow passages.

15. The method for charging a damper with pressurized gas as set forth in claim 12 wherein said damper also includes a valve member, said method further comprises the additional step of opening said valve member in response to the delivery of pressurized gas to said damper through said first flow passage so as to form a second flow passage.

16. The method for charging a damper with pressurized gas as set forth in claim 15, further comprising the additional step of removing said temporary distortion from said seal when the pressure of said gas within the damper has reached a predetermined level.

17. The method for charging a damper with gas as set forth in claim 12, further comprising the step of removing the temporary distortion from said seal when the pressure of said gas within the damper has reached a predetermined level.

18. The method for charging a damper with gas as set forth in claim 17, further comprising the step of removing said gas delivery chamber from said housing when the pressure of said gas has reached a predetermined level.

* * * * *